(12) United States Patent
Yang et al.

(10) Patent No.: US 9,325,636 B2
(45) Date of Patent: Apr. 26, 2016

(54) SCALING INTERCONNECTED IP FABRIC DATA CENTERS

(71) Applicant: CISCO TECHNOLOGY, Inc., San Jose, CA (US)

(72) Inventors: Yibin Yang, San Jose, CA (US); Alex Tsai, San Jose, CA (US); Liqin Dong, San Jose, CA (US); Di Jin, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 224 days.

(21) Appl. No.: 13/918,658

(22) Filed: Jun. 14, 2013

(65) Prior Publication Data

US 2014/0369345 A1 Dec. 18, 2014

(51) Int. Cl.
*H04L 12/46* (2006.01)
*H04L 12/947* (2013.01)
*H04L 12/18* (2006.01)

(52) U.S. Cl.
CPC ............ *H04L 49/25* (2013.01); *H04L 12/18* (2013.01); *H04L 12/1886* (2013.01)

(58) Field of Classification Search
CPC ............ H04L 61/6022; H04L 29/12839; H04L 45/50
USPC ........................... 370/392, 389, 474
See application file for complete search history.

(56) References Cited

U.S. PATENT DOCUMENTS

| | | | | |
|---|---|---|---|---|
| 6,304,901 | B1 * | 10/2001 | McCloghrie et al. | 709/221 |
| 6,553,028 | B1 * | 4/2003 | Tang et al. | 370/389 |
| 6,631,137 | B1 * | 10/2003 | Lorrain et al. | 370/401 |
| 7,570,579 | B2 * | 8/2009 | Oran | 370/216 |
| 7,684,355 | B2 * | 3/2010 | Meier et al. | 370/256 |
| 8,121,038 | B2 * | 2/2012 | Bergamasco et al. | 370/236 |

* cited by examiner

*Primary Examiner* — Wei Zhao
*Assistant Examiner* — Sai Aung
(74) *Attorney, Agent, or Firm* — Patterson + Sheridan

(57) ABSTRACT

Techniques which provide scalable techniques for managing multicast traffic in interconnected IP fabric data centers. More specifically, embodiments presented herein disclose an aggregated source technique used to address scalability issues for interconnected IP fabric data centers as well as disclose a secondary rendezvous point technique used to address backbone network (S, G) multicast state scalability. Additionally, embodiments disclosed herein include an approach for border leaf load balancing based on group destination addresses used by VTEPs.

27 Claims, 6 Drawing Sheets

SCALING INTERCONNECTED IP FABRIC DATA CENTERS

TECHNICAL FIELD

Embodiments presented herein generally relate to techniques for managing computer network infrastructure. More specifically, embodiments presented herein provide techniques used to scale interconnected IP fabric data centers using aggregated source replacement and secondary rendezvous point techniques for multicast packets.

BACKGROUND

IP fabric data center (DC) is an emerging technology for data center networks. Typically, an IP fabric data center uses a topology based on a two-tier fat-tree, where each leaf router connects to each spine router and vice versa. Within the fabric, an interior gateway protocol (IGP) such as IS-IS and a protocol independent multicast (PIM) (e.g., PIM-SM) are used for unicast and multicast traffic, respectively. To support interconnectivity among data centers certain leaf routers, referred to as border leafs (BLs), connect each data center to a backbone network.

To provide multitenant separation, different virtual local area networks (LANs) are created using an overlay. For example, virtual extensible local area network (VxLAN) is layer 2 overlay used to create isolated, multi-tenant logical networks that span physical network boundaries. VxLAN encapsulates customer frames with a VxLAN header and uses UDP/IP for transportation. A VxLAN header contains a VxLAN segment ID/VxLAN network identifier (VNI), which is a 24-bit field to identify a given virtual layer 2 network.

While the 24-bit field allows a large number of distinct VxLANs to coexist on a common physical infrastructure (addressing a scalability issue for conventional VLANs), VxLAN nevertheless has some scalability issues. For example, when connecting different data centers, the IP backbone network needs to maintain (S, G) multicast states proportional to the number of VxLAN Tunnel End Points (VTEPs) functioning as multicast sources. Similarly, the next hop adjacencies in VTEP tables are proportional to the number of source VTEPs. Further, virtual machine (VM) machine migration within a data center incurs MAC moves in other data centers. Given a possible large number of VTEPs, both software and hardware, and frequent VM movement within a data center, a straightforward approach for managing multicast traffic states in interconnected IP fabric data centers does not scale well.

BRIEF DESCRIPTION OF THE DRAWINGS

So that the manner in which the above recited aspects are attained and can be understood in detail, a more particular description certain embodiments, briefly summarized above, may be had by reference to the appended drawings.

It is to be noted, however, that the appended drawings illustrate only typical embodiments and are therefore not to be considered limiting of its scope.

DESCRIPTION

Overview

Figure 1:
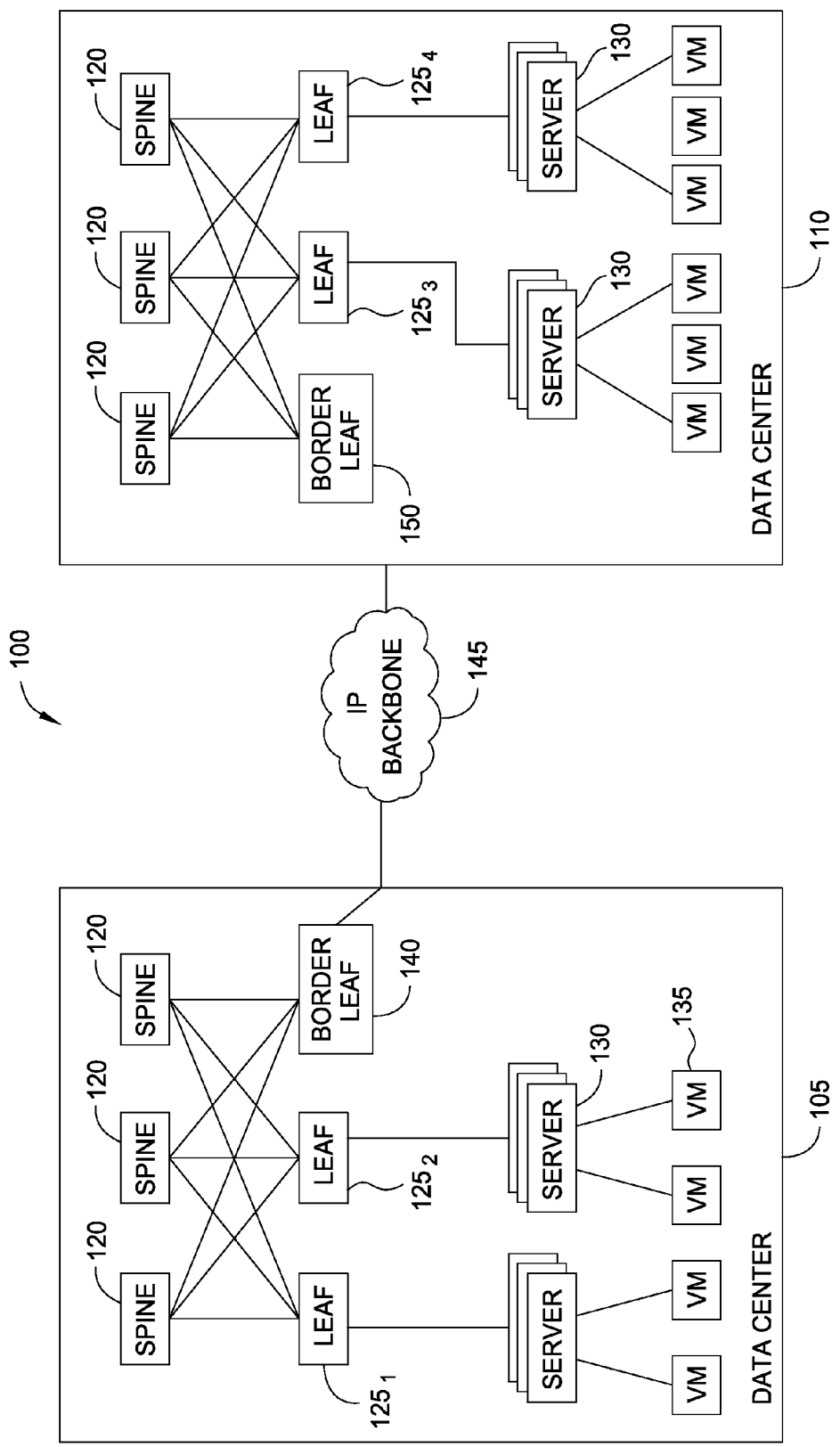
FIG. 1 illustrates an example of two IP fabric data centers interconnected over an IP backbone, according to one embodiment.

Embodiments presented herein include a method for processing network traffic on a network device. This method may generally include receiving a packet with a header encapsulating a MAC frame, where the packet includes a group address as a destination address. This method may also include replacing a source address in the header with an address of the networking device and forwarding the packet towards the destination identified by the destination address.

In a particular embodiment, the networking device is a border leaf in a first IP data center fabric and wherein the border leaf connects the first IP data center fabric to a second IP data center fabric over an IP backbone network. Further, the networking devices may provide a secondary rendezvous point and root of a multicast tree for the first data center, and wherein the IP backbone network includes a primary rendezvous point for multicast traffic spanning the first IP data center fabric and the second IP data center fabric.

Description of Example Embodiments

Embodiments presented herein provide scalable techniques for managing multicast traffic in interconnected IP fabric data centers. More specifically, embodiments presented herein disclose an aggregated source technique used to address scalability issues for interconnected IP fabric data centers as well as disclose a secondary rendezvous point technique used to address backbone network (S, G) multicast state scalability. Additionally, embodiments disclosed herein include an approach for border leaf load balancing based on group destination addresses used by VTEPs.

In one embodiment, a border leaf router aggregates source IP addresses in VxLAN headers for traffic between IP fabric data centers. To do so, a border leaf router replaces the source IP addresses in VxLAN unicast or multicast packets exiting a data center with the address of the border leaf router. This approach effectively aggregates multiple source addresses into one for purposes of source address learning and multicast reachability. The border leaf router also maintains a MAC/IP binding table, allowing the source IP address of the leaf router which encapsulated a packet with the VxLAN header to be identified. In the reverse direction, i.e., for a VxLAN unicast packet going into a data center through a border leaf router, the destination IP address is replaced with the IP address of a leaf router to which the destination MAC address is attached, as identified in the MAC/IP binding table.

In one embodiment, the border leaf router connecting the IP fabric data center to a network backbone may operate as a secondary rendezvous point (RP) for multicast traffic in the IP fabric data center. For example, the border leaf router may serve as a proxy for the data center by relaying PIM-SM messages to outside of the data center. At the same time, the border leaf router isolates the IP fabric data center from the backbone network by not relaying unneeded multicast messages to inside of the data center. In one embodiment, the border leaf router operates as the root of a shared tree for multicast traffic terminated in the data center. To do so, the border leaf may act as the rendezvous point for all leaf and spine routers within the data center. At the same time, a primary RP remains configured in the backbone network, and for multicast traffic external to the data center, the border leaf router operates as a regular multicast sender or receiver. The border leaf router can send join, prune and register messages on behalf of the whole data center to the primary RP in the backbone network.

The discussion below uses an example of a ping request sent from a host in one data center to a host in another data center using VxLAN as an overlay, as a reference example to illustrate source aggregation and secondary rendezvous points. Of course, one of skill in the art will recognize that the techniques for source aggregation and secondary rendezvous points are not limited to the network traffic resulting from one host pinging another. Further, while described below using routers in a data center, embodiments may be adapted for use with a variety of network hardware (and virtualized network hardware), whether referred to as a "router" or "switch," or otherwise.

FIG. 1 illustrates a campus network 100, according to one embodiment. In this example, campus network 100 includes data center 105 and data center 110, located at different sites. As shown, data center 105 and data center 110 each include six routers. In this example, each spine router 120 in data center 105 (and data center 110) is connected to each leaf router 125. Additionally, leaf routers 125 are connected to one or more host servers 130, each of which can run a collection of virtual machines 135. In addition, data centers 105, 110 each include a border leaf router 140, 150, respectively. The border leaf routers 140, 150 connect data centers 105, 110 to an IP backbone 145, allowing data center 105 to send and receive layer-2 traffic from data center 110. To do so, within data centers 105, 110, leaf routers $125_{1-4}$ each function as a VxLAN tunnel end point (VTEPs, i.e., leaf $125_{1-2}$ in data center 105 and leaf $125_{3-4}$ in data center 110). The leaf routers $125_{1-4}$ perform VxLAN encapsulation and decapsulation on frames coming from and going to virtual machines (VM) 135 running on the attached host servers 130. For example, border leaf router $125_2$ encapsulates and decapsulates frames for VM 135 running on one of the servers 130.

As data centers 105, 110 are IP based and VxLAN uses UDP/IP for transport, existing IP protocols can be used to provide end-to-end connectivity between data centers 105, 110. However, as noted above, doing so results in a variety of scalability issues. For example, when connecting different data centers, the IP backbone network 145 needs to maintain (S, G) multicast states proportional to the number of VxLAN Tunnel End Points (VTEPs) functioning as multicast sources, i.e., to the number of border leafs 125. Similarly, the next hop adjacencies in VTEP tables are proportional to the number of source VTEPs.

To address this issue, border leaf 140, 150 may be configured both to perform source aggregation and to act as a secondary rendezvous point, as described in greater detail below. Assume for this discussion that IP unicast and multicast reachabilities are established by protocols such as IS-IS, BGP and PIM-SM. Of course, one of skill in the art will recognize that other unicast and multicast protocols could be used. Further, for ease of discussion, assume VMs 135 belong to a common tenant and one group destination address, G, is used by all VTEPs (i.e., by leaf routers $125_{1-4}$). In such a case, the VTEPs (again, leaf routers $125_{1-4}$) send (*, G) joins to a rendezvous point (RP) in the IP backbone network 145 and a shared tree is established from the primary RP to the VTEPs (i.e., to leaf routers $125_{1-4}$).

Figure 2:
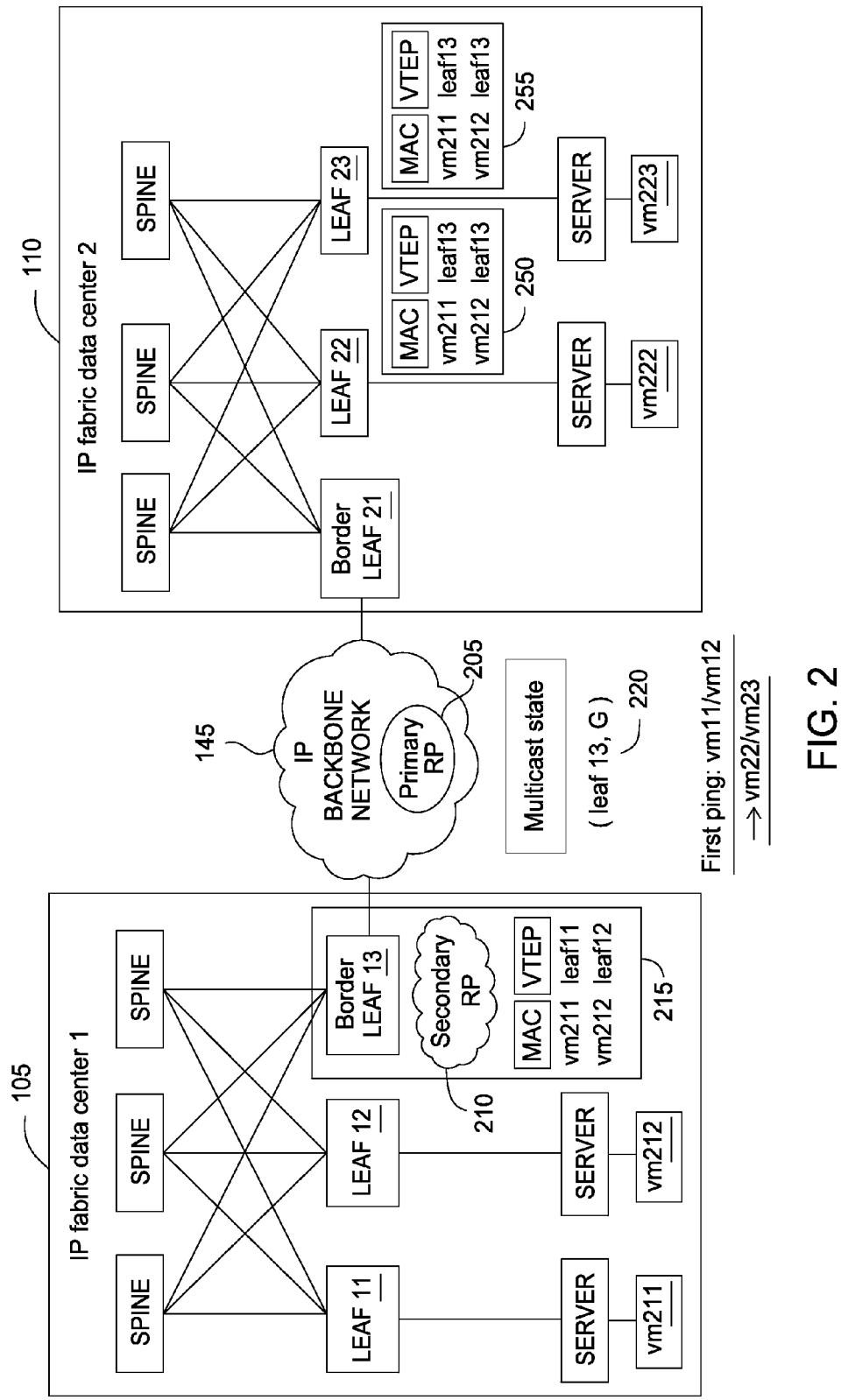
FIG. 2 illustrates source aggregation and a secondary rendezvous point for an IP fabric data center, according to one embodiment.

FIG. 2 illustrates source aggregation and a secondary rendezvous point for an IP fabric data center, according to one embodiment. For this discussion, assume that border leaf 13 implements an embodiment of source aggregation and secondary RP, but that border leaf 21 does not. Initially, VTEPs in data center 110 (specifically, leafs 22, 23) send (*, G) joins to the primary RP 205 in the backbone network 145, while VTEPs in data center 105 (specifically leafs 11, 12) send (*, G) joins to the secondary RP 210 instead. In one embodiment, the secondary RP 210, on border leaf 13, relays any (*, G) join messages from leaf 11 or leaf 12 to the primary RP 205. Doing so results in shared tree rooted at the primary RP 205 and a sub-tree rooted at the secondary RP 210.

To illustrate source aggregation performed by the border leaf 13, as well as the use of the secondary RP, assume VM 211 sends a ping message to VM 222. To do so, VM 211 sends out an ARP request, which is in a broadcast frame. When received, leaf 11 encapsulates the frame in a VxLAN packet, with a destination IP address of G and sends the VxLAN packet in a register message to the secondary RP 210 on border leaf 13 (following the PIM-SM register process). Once received, border leaf 13 decapsulates the register message and forwards the VxLAN packet along the shared sub-tree to leaf 12. That is, the border leaf 13 forwards the broadcast message in the MAC frame encapsulated by the VxLAN packet back towards other leaf nodes in data center 105.

In addition, border leaf 13 learns a MAC/IP binding of (VM 211, leaf 11). Border leaf 13 also re-encapsulates the VxLAN packet in a register message sent to the primary RP 205. However, in the register message sent to primary RP 205, the border leaf 13 replaces the source IP address (i.e., the source IP of leaf 11) in the VxLAN packet with the IP address of the border leaf 13. Lastly, border leaf 13 triggers (leaf 11, G) join messages back to leaf 11, which establishes (leaf 11, G) multicast states within the data center. Note, border leaf 13 may also send a Register-Stop message to leaf 11 when it receives native multicast packets from leaf 11.

As noted, the register message is sent to the primary RP 205 configured in the IP backbone network 145. Once received, the primary RP 205 decapsulates the register message and forwards the VxLAN packet along the shared tree to leaf 22 and leaf 23. The primary RP also triggers joins back to leaf 13, which establish (leaf 13, G) multicast states 220 in the IP backbone network. Once the VxLAN packet is received, leaf 22 decapsulates the VxLAN packet and floods it to VM 222. Leaf 22 also learns the MAC/IP binding of (VM 211, leaf 13), and stores this binding into a VTEP table 250. At this point, after receiving the ARP request in the MAC frame sent by VM 211, VM 222 generates an ARP response to addressed to VM 211, which is in a unicast frame. VM 222 forwards the ARP response towards VM 211 by forwarding this frame to leaf 22 (i.e., to its only next hop adjacency). Once received, leaf 22 encapsulates the ARP response in a VxLAN packet, with leaf 13 as the destination IP address. Note, the destination IP address may be identified using a lookup in VTEP table 250. Leaf 22 then forwards the VxLAN packet towards leaf 13.

Once the VxLAN packet storing the unicast ARP response is received, leaf 13 replaces the destination address in the VxLAN packet with the IP address of leaf 11, based on a lookup of the MAC/IP binding table 215. Leaf 31 learned this MAC/IP binding from the ARP request. Note, that network address port translation (NAPT) cannot be used as VxLAN always uses a reserve number for a destination UDP port. Leaf 13 then forwards the VxLAN packet towards leaf 11, based on the results of the look up. Once received, leaf 11 decapsulates the VxLAN packet and forwards the encapsulated ARP response to VM 211. Leaf 11 also learns the MAC/ IP binding of (VM 222, leaf 22) and stores this mapping in a VTEP table.

FIG. 2 illustrates multicast states in the backbone network 145 (in table 220) and VTEP MAC/IP bindings in data center 110 (in table 250 and 255) after VM 211 and VM 212 ping VM 222 and VM 223 for the first time, using the same sequence discussed above. Configuring border leaf 13 to use source aggregation and address replacement reduces the multicast state in the backbone network 145 (in table 220) and next hop adjacencies in leaf 22 and leaf 23 (tables 250 and 255) from two to one. In addition, if a VM in data center 105 moves from one server to another, e.g., VM 211 moves to server attached to leaf 12, no MAC move is triggered in leaf 22 or leaf 23 of data center 110 because the next hop adjacencies for these leaf routers remain as border leaf 13. Therefore, the aggregated source and secondary rendezvous point techniques discussed above address the scalability issues noted above.

To support aggregated source, border leaf 210 maintains a MAC/IP binding table to identify original sources address. This table is generally the same as the VTEP tables 250, 255 of leaf 22 and leaf 23 and constructed through source learning just like VTEP. Therefore, the hardware support for aggregated source can be based on an existing VTEP hardware implementation with minimal changes. In addition, this table is limited in size, as it learns MAC addresses for hosts within data center 105. To function as a secondary RP, border leaf 13 needs to manage PIM-SM messages as illustrated in Table 1, below.

TABLE 1

Forwarding rules for Border Leaf acting as secondary RP

| Border leaf receives message from? | Register Message | (*, G) Join/Prune message | (S, G) Join/Prune message | (S, G, rpt) Join/Prune message |
|---|---|---|---|---|
| Data Center | Replace inner and outer source IP addresses with border leaf IP address; relay to primary RP | Relay to primary RP | Relay to the source | Relay to primary RP |
| IP Backbone | N/A, Border leaf not primary RP | Do not relay into data center | Do not relay into data center | N/A, Border leaf not primary RP |

Figure 3:
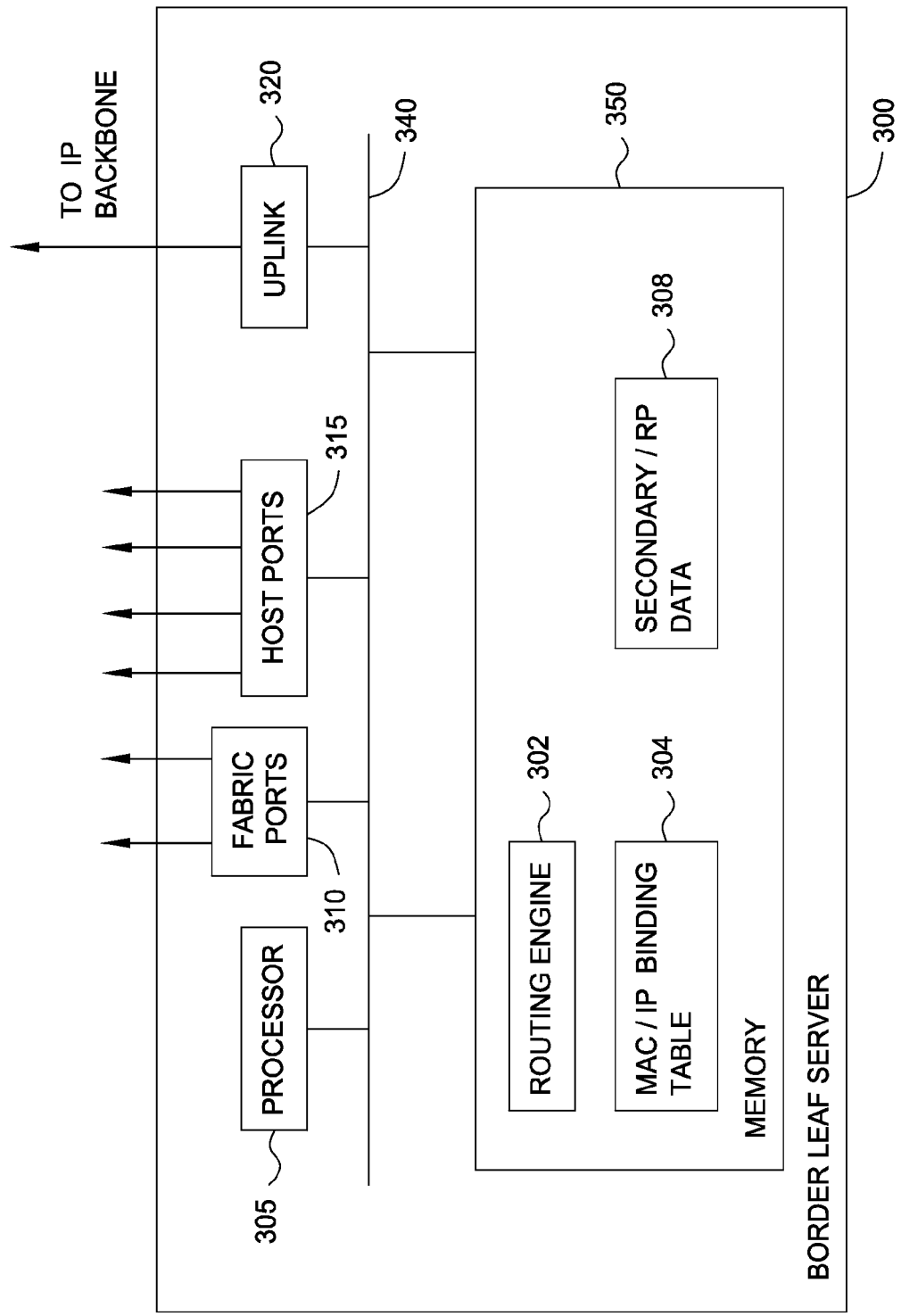
FIG. 3 illustrates an example border leaf router, according to one embodiment.

FIG. 3 illustrates an example border leaf router 300, according to one embodiment. As shown, border leaf router 300 includes a processor, 305, fabric ports 310, host ports 315, an uplink 320, and a memory 350 connected by a bus 340. Note, border leaf router 300 is included to be generally representative of a variety of routing or switching network elements. The processor 305 is included to be generally representative of a processing element configured to execute an instruction set under control of an operating system (e.g., the IOS network operating system available in network routers and switches available from Cisco Systems). The fabric ports 310 connect border leaf router 300 to spine routers in an IP fabric data center. Host ports 325 connect border leaf router to host servers (e.g., servers running VM instances). Uplink 320 connects border leaf router to an IP backbone network.

Also as shown, the memory 350 includes a routing engine 302, a MAC/IP binding table 304, a routing table 306, and a secondary RP data 308. The routing engine 302 generally provides one or more application components executed on processor 305 and configured to manage traffic received from and sent to hosts connected to host ports 315. MAC/IP binding table 304 stores addresses for source aggregation. For example, as noted above, the routing engine may replace the source IP address of a VxLAN packet sent from a leaf node with the IP Address of the border leaf router 300. When this happens the routing engine 302 stores the source MAC address of the frame encapsulated by the VxLAN packet and the original source IP address in an entry in MAC/IP binding table 304. Secondary RP data 308 stores the information used by border leaf router to act as a secondary RP. For example, the Secondary RP data 308 may indicate (1) it is a secondary RP, which should function differently from a primary RP, per table 1, (2) the IP address of the primary RP, and (3) multicast states which are used to facilitate its functioning as a secondary RP.

Figure 4A:
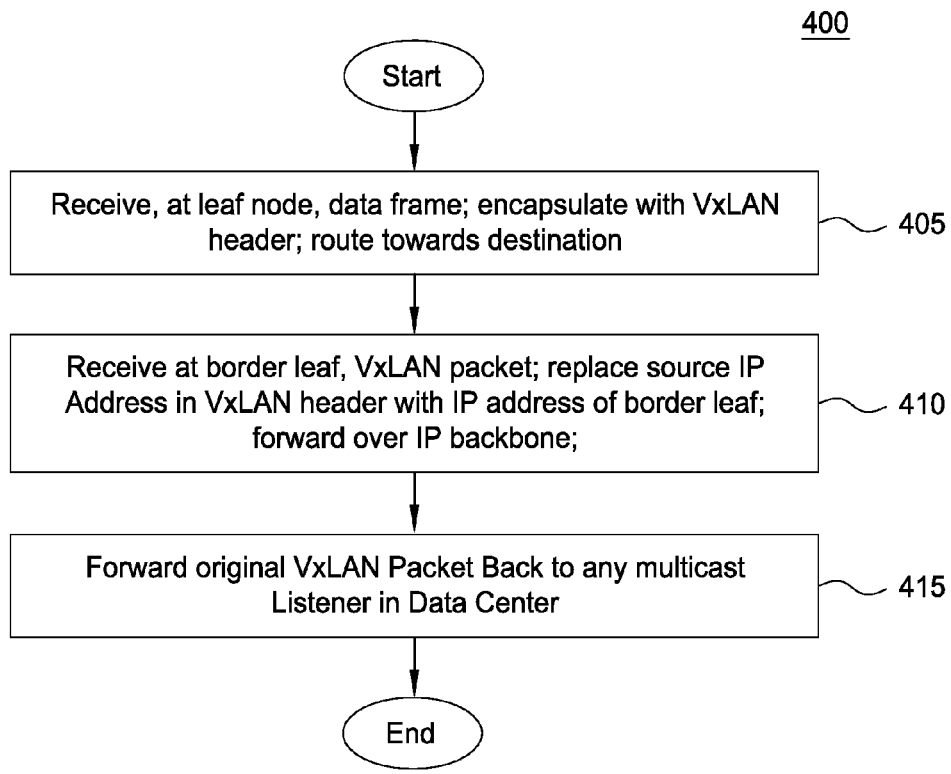
FIGS. 4A-4B illustrate methods for source address aggregation on a border leaf router of an IP fabric data center, according to one embodiment.
Figure 4B:
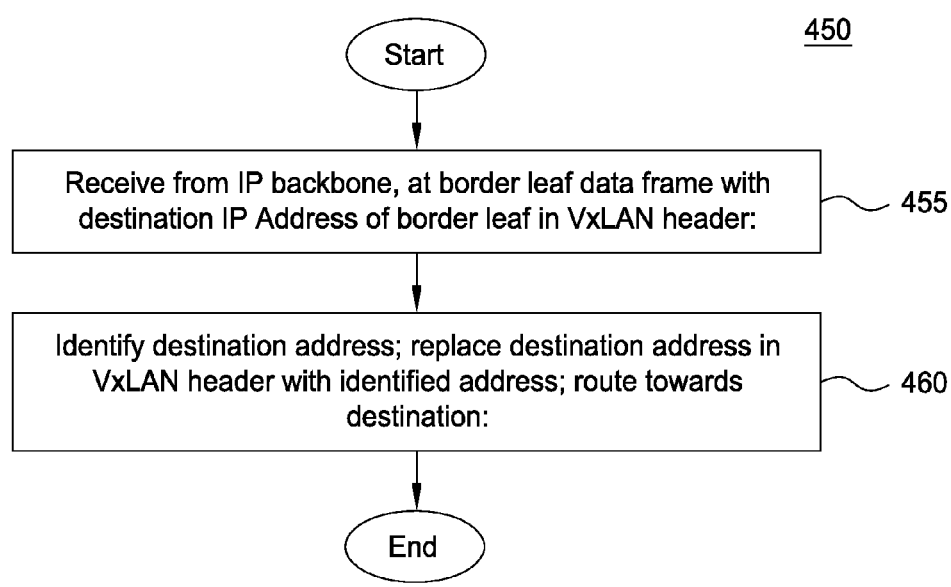

FIGS. 4A-4B illustrate methods for source address aggregation on a border leaf router of an IP fabric data center, according to one embodiment. First, FIG. 4A illustrates a method 400 for aggregating source addresses for traffic forwarded to an IP network backbone by a border leaf router. As shown, the method 400 begins at step 405 where leaf receives a frame from a connected host. For example, a host may send out an ARP request listing a broadcast address as a destination. In response, the leaf router encapsulates the MAC in a VxLAN header and forwards it in a PIM register message towards the border leaf as a secondary rendezvous point for multicast traffic That is, the leaf switch has the border leaf configured as RP and thus sends a PIM-SM register message containing the VxLAN packet to the border leaf. At step 410, when received by a border leaf which (acting as the secondary rendezvous point), the border leaf router decapsulates the PIM register message and replaces the source IP address VxLAN header with an IP Address of the border leaf. In addition, the border leaf router may record a binding between the source MAC address in the underlying broadcast frame and the original source address of the VxLAN packet. The border leaf then forwards the modified VxLAN packet over the IP backbone network. Specifically, the border leaf forwards the VxLAN packet as a register message to the primary RP. In addition (at step 415), the border leaf also forwards the original (source IP address not replaced) VxLAN packet to other leafs within the data center which are interested in the multicast group.

FIG. 4B illustrates a method 450 for a border leaf to manage traffic received from the IP backbone network. As shown, the method 450 begins at step 455 where a border leaf receives a VxLAN packet listing the IP address of the border leaf as a destination. This can result from two scenarios. First, the border leaf may have one or more connected hosts. Second, the destination address may be the result or source aggregation, where the border leaf replaced an original source IP address in a VxLAN packet with the IP address of the border leaf. In either case, the border leaf maintains a MAC/IP binding table used to identify a destination for the VxLAN packet received at step 455. At step 460, the border leaf identifies a destination for the VxLAN packet using the MAC/IP binding table. If the destination is for a host connected to the border leaf, then the border leaf decapsulates the VxLAN packet and forwards the resulting MAC frame over an interface, e.g., towards a server. However, if the destination is for another leaf node, then the border leaf rewrites the destination IP Address to be the identified leaf node and forwards the VxLAN packet towards that leaf node. For example, the border leaf may forward the VxLAN packet towards one of the spine routers, which in turn forwards it to the destination leaf node. The destination leaf node then decapsulates the MAC frame from the VxLAN packet and forwards it towards a host.

Figure 5:
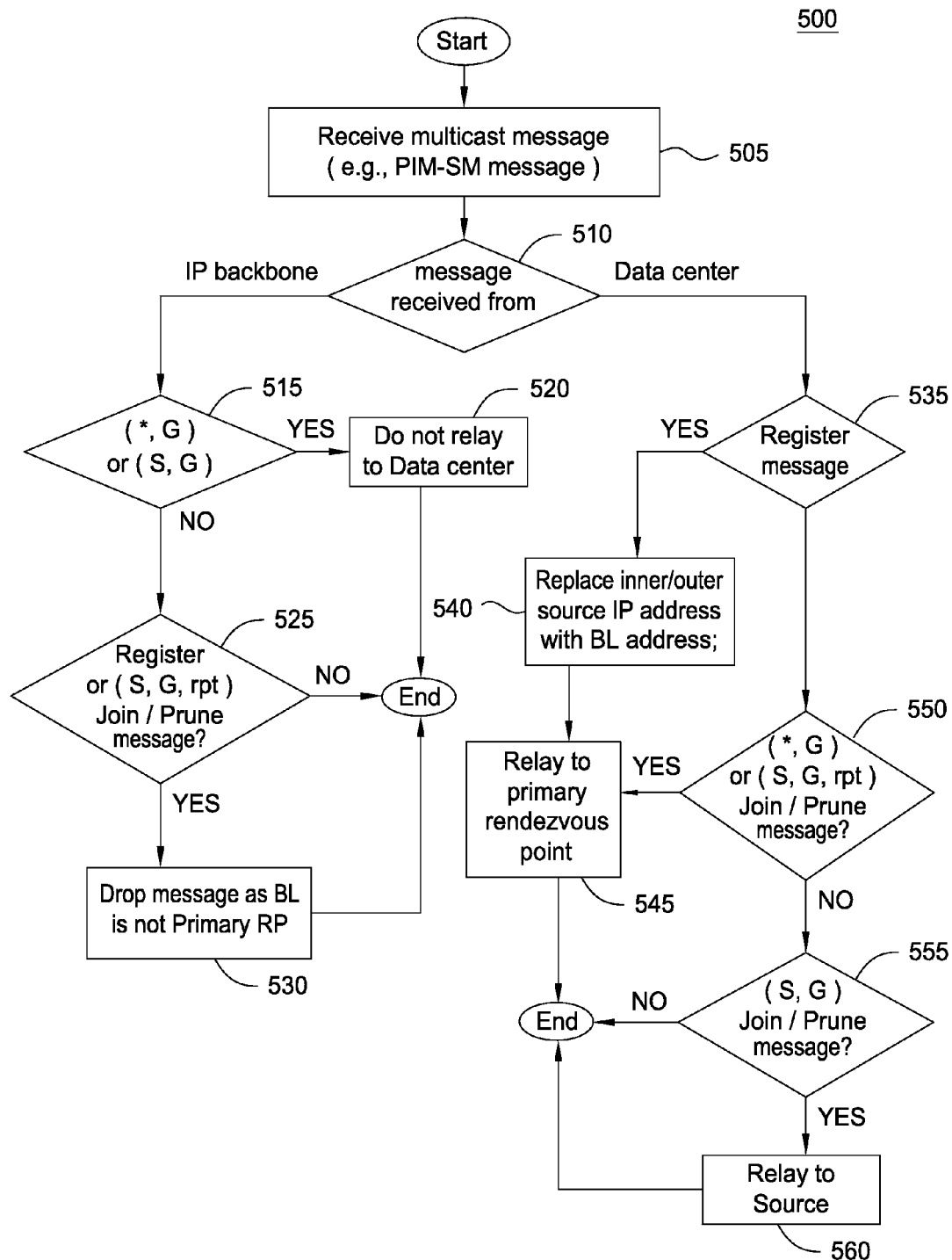
FIG. 5 illustrates a method for a border leaf router to act as a secondary rendezvous point in an IP fabric data center, according to one embodiment.

FIG. 5 illustrates a method for a border leaf router to act as a secondary rendezvous point in an IP fabric data center, according to one embodiment. The method 500 generally corresponds to Table I, above.

As shown, the method 500 begins at step 505 where a border leaf node receives a multicast message (e.g., a PIM-SM register message). At step 510, the border leaf determines whether the multicast message was received from the IP backbone network or from within the IP fabric data center. If received from the IP backbone, then border leaf determines whether the message is either a (*, G) or a (S, G) join/prune message. If so, then at step 520, the border leaf drops the message, as it does not need to be forwarded inside the data center. Otherwise, at step 525, if the message is either a register message or a (S, G, rpt) Join/Prune message, which is unlikely to happen as the border leaf is not the primary RP, then the border leaf drops the message.

Returning to step 510, if the border leaf determines that the message was received from inside the data center, then the method proceeds to step 535. And at step 535, the border leaf determines whether the message is a PIM register message. That is, the border leaf determines whether it should act as a secondary rendezvous point for a multicast group rooted at the border leaf. If so, the border leaf replaces the inner and outer source IP address (i.e., the IP address in the VxLAN header and the address in the PIM register message) with the IP Address of the border leaf (step 540). That is, the border leaf uses its IP address as the aggregated source for all addresses behind the border leaf. At step 545, the border leaf then relays the VxLAN packet with the replaced IP address in a PIM register message to the primary RP in the IP backbone network. Returning to step 535, if the message is not a register message, then at step 550, the border leaf determines whether the message is either a (*, G) or (S, G, rpt) Join/Prune message. If so, the border leaf relays the message, without change towards the primary RP in the IP backbone network (step 545). Otherwise, at step 555, the border leaf determines whether the message is a (S, G) Join/Prune message. If so, then the border leaf relays the message towards the source identified in the (S, G) message.

Method 400 allows the border leaf to serve as a proxy for the data center behind the leaf node by relaying PIM-SM messages outside of the data center, as described above. Further, method 500 isolates the data center from the backbone network by not relaying PIM-SM messages to inside of the data center.

Figure 6:
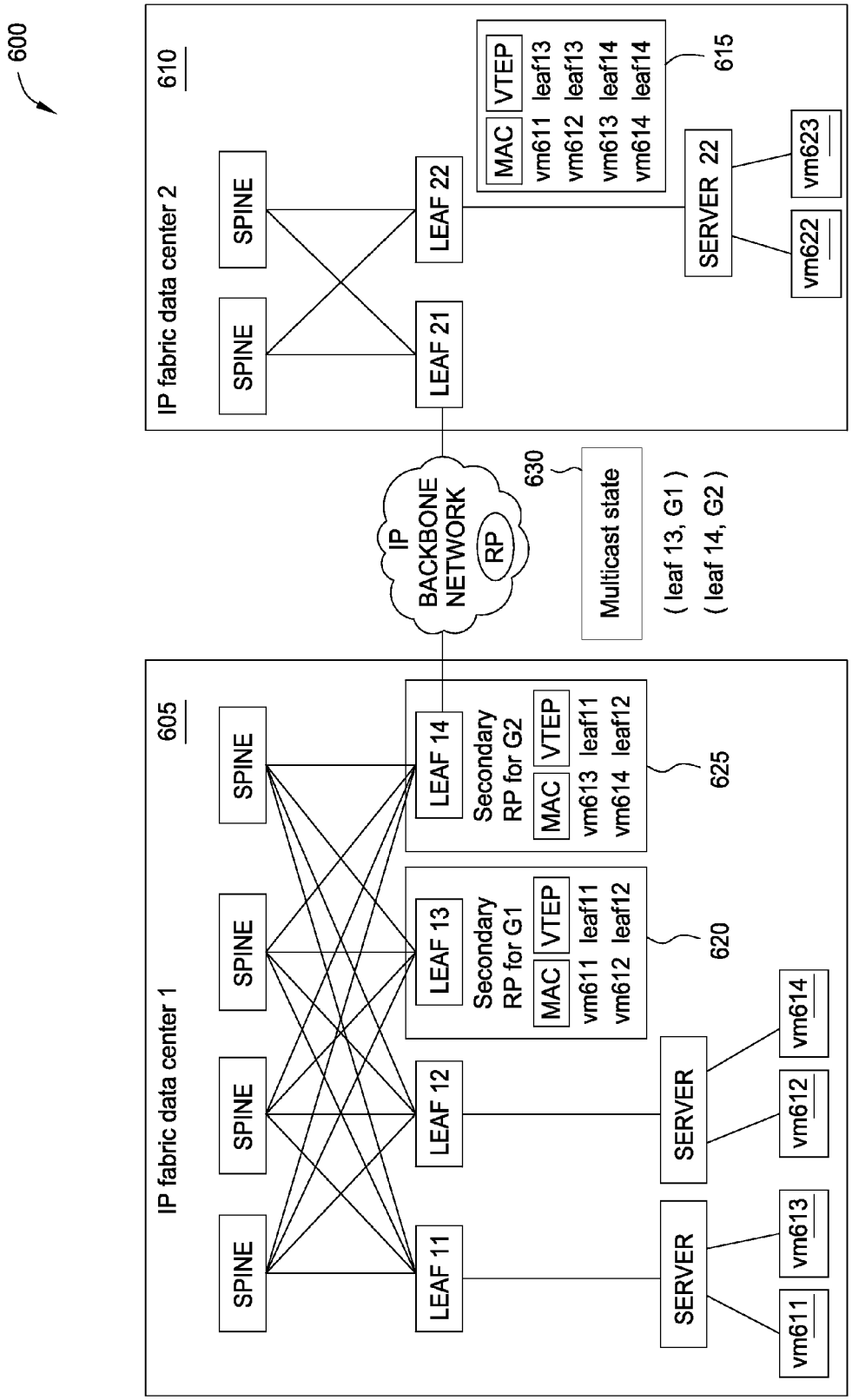
FIG. 6 illustrates an example of border leaf node balancing in an IP fabric data center, according to one embodiment.

FIG. 6 illustrates an example of border leaf node balancing in an IP fabric data center, according to one embodiment. The examples in FIG. 1 and FIG. 2 illustrate source aggregation and secondary rendezvous point using a single border leaf in data center 105 and a single tenant. However, embodiments may be adapted for use with multiple border leafs in a data center and/or multiple tenants. For example, FIG. 6 illustrates a data center 605 with two tenants. Specifically, data center 605 includes border leaf 13 and border leaf 14. In this example, assume a first tenant includes VM 611, VM 612, and VM 622 and a second tenant includes VM 613, VM 614, and VM 623. Suppose the two tenants use different multicast group address, G1 and G2, respectively, for transporting multi-destination frames. In this case, for the purpose of load balancing, border leaf 13 acts as a secondary RP for multicast group G1 while border leaf 14 acts as the secondary RP for G2.

After VMs 611-614 ping VM 622 and VM 623 for the first time, multicast states in the backbone network and VTEP MAC/IP bindings in data center 610 are established, as shown in tables 630 and 615. FIG. 6 also shows the resulting MAC/IP binding tables 620, 625 for border leaf 13 and border leaf 14, respectively. As shown, border leaf 13 maintains bindings for VM 611, VM 612, and VM 622 and border leaf 14 maintains MAC/IP bindings for VM 613, VM 614, and VM 623. Therefore, traffic of the two tenants are split between the two border leafs. Further, the multicast state maintained by the primary rendezvous point is shown in Table 630.

The techniques described above provide good backward compatibility. For example a data center implementing the source aggregation and secondary rendezvous point techniques described above can co-exist with other conventional data centers. Thus, as described above, data center 105 as shown in FIG. 2 implements these techniques while being connected to a data center 110 does not. Further, no change is required for leafs and spines of a data center implementing the source aggregation and secondary rendezvous point techniques described above. Instead, changes are only required for the border leafs used to connect a data center to an IP backbone.

As described, embodiments presented herein provide scalable techniques for managing multicast traffic in interconnected IP fabric data centers. More specifically, embodiments presented herein disclose an aggregated source technique used to address scalability issues for interconnected IP fabric data centers as well as disclose a secondary rendezvous point technique used to address backbone network (S, G) multicast state scalability. Additionally, embodiments disclosed herein include an approach for border leaf load balancing based on group destination addresses used by VTEPs.

In the following, reference is made to certain embodiments of the invention. However, the invention is not limited to any specifically described embodiment. Instead, any combination of the following features and elements, whether related to different embodiments or not, is contemplated to implement and practice the invention. Furthermore, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples a computer readable storage medium include: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the current context, a computer readable storage medium may be any tangible medium that can contain, or store a program for use by or in connection with an instruction execution system, apparatus or device.

The flowchart and block diagrams in the Figures illustrate the architecture, functionality and operation of possible implementations of systems, methods and computer program products according to various embodiments of the present invention. In this regard, each block in the flowchart or block diagrams may represent a module, segment or portion of code, which comprises one or more executable instructions for implementing the specified logical function(s). In some alternative implementations the functions noted in the block may occur out of the order noted in the figures. For example, two blocks shown in succession may, in fact, be executed substantially concurrently, or the blocks may sometimes be executed in the reverse order, depending upon the functionality involved. Each block of the block diagrams and/or flowchart illustrations, and combinations of blocks in the block diagrams and/or flowchart illustrations can be implemented by special-purpose hardware-based systems that perform the specified functions or acts, or combinations of special purpose hardware and computer instructions.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources. A user can access any of the resources that reside in the cloud at any time, and from anywhere across the Internet.

While the foregoing is directed to embodiments of the present invention, other and further embodiments of the invention may be devised without departing from the basic scope thereof, and the scope thereof is determined by the claims that follow.

What is claimed is:

1. A networking device in a first data center fabric connected to a second data center fabric over a backbone network to form interconnected data center fabrics configured with improved scalability in managing states, each data center fabric having a respectively plurality of endpoints of which a subset is designated as one or more border leaves of the respective data center fabric, the networking device comprising:

a computer processor; and
a memory storing an application which, when executed on the computer processor, performs an operation comprising:
receiving a packet with a header encapsulating a media access control (MAC) frame, wherein the packet has a group address as a destination address;
applying aggregated source replacement such that a total count of distinct source addresses stored in unicast states maintained in the second data center fabric scales with border leaves rather than endpoints, thereby improving scalability of maintaining unicast states in the second data center fabric, wherein applying aggregated source replacement includes replacing, in a source address field in the header, an address of an endpoint in the first data center fabric with an address of a border leaf of the first data center fabric and comprising the networking device; and
forwarding the packet towards the destination identified by the destination address;
wherein the backbone network includes a primary rendezvous point for multicast traffic spanning the first and second data center fabrics, wherein the networking device serves as a secondary rendezvous point such that a total count of multicast states maintained in the backbone network scales with border leaves rather than with endpoints functioning as multicast sources, thereby improving scalability of maintaining multicast states in the backbone network.

2. The networking device of claim 1, wherein the first and second data center fabrics comprise first and second Internet Protocol (IP) data center fabrics, wherein the backbone network comprises an IP backbone network, wherein the border leaf connects the first IP data center fabric to the second IP data center fabric over the IP backbone network.

3. The networking device of claim 2, wherein the operation further comprises sending one or more join messages to the source address identified in the packet to establish a multicast state in the first IP data center fabric.

4. The networking device of claim 2, wherein the operation further comprises, prior to replacing the source address in the header, forwarding the packet towards one or more leaf networking devices in the first IP data center fabric.

5. The networking device of claim 2, wherein the networking device is a root of a multicast tree for the first IP data center fabric.

6. The networking device of claim 1, wherein the operation further comprises storing, in the memory, a binding between a source MAC address in the MAC frame and the source address in the header.

7. The networking device of claim 1, wherein the operation further comprises:
receiving a second packet, wherein the second packet includes a header encapsulating a second MAC frame, wherein the header includes, as a destination address, the address of the networking device;
identifying, via the binding, a replacement destination address for the second packet;
replacing the destination address of the second packet with the replacement address; and
forwarding the second packet towards the destination identified by the destination address.

8. A computer-implemented method of improved scalability in managing states in interconnected data center fabrics including a first data center fabric connected to a second data center fabric over a backbone network, each data center fabric having a respectively plurality of endpoints of which a subset is designated as one or more border leaves of the respective data center fabric, the computer-implemented method comprising:

receiving a packet with a header encapsulating a media access control (MAC) frame, wherein the packet has a group address as a destination address;

applying aggregated source replacement such that a total count of distinct source addresses stored in unicast states maintained in the second data center fabric scales with border leaves rather than with endpoints, thereby improving scalability of maintaining unicast states in the second data center fabric, wherein applying aggregated source replacement includes replacing, in a source address field in the header, an address of an endpoint in the first data center fabric with an address of a border leaf of the first data center fabric and comprising a networking device; and forwarding the packet towards the destination identified by the destination address;

wherein the backbone network includes a primary rendezvous point for multicast traffic spanning the first and second data center fabrics, wherein the networking device serves as a secondary rendezvous point such that a total count of multicast states maintained in the backbone network scales with border leaves rather than with endpoints functioning as multicast sources, thereby improving scalability of maintaining multicast states in the backbone network.

9. The computer-implemented method of claim 8, wherein the first and second data center fabrics comprise first and second Internet Protocol (IP) data center fabrics, wherein the backbone network comprises an IP backbone network, wherein the border leaf connects the first IP data center fabric to the second IP data center fabric over the IP backbone network.

10. The computer-implemented method of claim 9, further comprising sending one or more join messages to the source address identified in the packet to establish a multicast state in the first IP data center fabric.

11. The computer-implemented method of claim 9, further comprising, prior to replacing the source address in the header, forwarding the packet towards one or more leaf networking devices in the first IP data center fabric.

12. The computer-implemented method of claim 9, wherein the networking device is a root of a multicast tree for the first IP data center fabric.

13. The computer-implemented method of claim 8, further comprising, storing, in the memory, a binding between a source MAC address in the MAC frame and the source address in the header.

14. The computer-implemented method of claim 8, further comprising:

receiving a second packet, wherein the second packet includes a header encapsulating a second MAC frame, wherein the header includes, as a destination address, the address of the networking device;

identifying, via the binding, a replacement destination address for the second packet;

replacing the destination address of the second packet with the replacement address; and forwarding the second packet towards the destination identified by the destination address.

15. A non-transitory computer-readable medium storing instructions which, when executed, performs an operation to improve scalability in managing states in interconnected data center fabrics including a first data center fabric connected to a second data center fabric over a backbone network, each data center fabric having a respectively plurality of endpoints of which a subset is designated as one or more border leaves of the respective data center fabric, the operation comprising:

receiving a packet with a header encapsulating a media access control (MAC) frame, wherein the packet has a group address as a destination address;

applying aggregated source replacement such that a total count of distinct source addresses stored in unicast states maintained in the second data center fabric scales with border leaves rather than endpoints, thereby improving scalability of maintaining unicast states in the second data center fabric, wherein applying aggregated source replacement includes replacing, in a source address field in the header, an address of an endpoint in the first data center fabric with an address of a border leaf of the first data center fabric and comprising a networking device; and forwarding the packet towards the destination identified by the destination address;

wherein the backbone network includes a primary rendezvous point for multicast traffic spanning the first and second data center fabrics, wherein the networking device serves as a secondary rendezvous point such that a total count of multicast states maintained in the backbone network scales with border leaves rather than with endpoints functioning as multicast sources, thereby improving scalability of maintaining multicast states in the backbone network.

16. The non-transitory computer-readable medium of claim 15, wherein the first and second data center fabrics comprise first and second Internet Protocol (IP) data center fabrics, wherein the backbone network comprises an IP backbone network, wherein the border leaf connects the first IP data center fabric to the second IP data center fabric over the IP backbone network.

17. The non-transitory computer-readable medium of claim 16, wherein the operation further comprises, sending one or more join messages to the source address identified in the packet to establish a multicast state in the first IP data center fabric.

18. The non-transitory computer-readable medium of claim 16, wherein the operation further comprises, prior to replacing the source address in the header, forwarding the packet towards one or more leaf networking devices in the first IP data center fabric.

19. The non-transitory computer-readable medium of claim 16, wherein the networking device is a root of a multicast tree for the first IP data center fabric.

20. The non-transitory computer-readable medium of claim 15, wherein the operation further comprises storing, in the memory, a binding between a source MAC address in the MAC frame and the source address in the header.

21. The non-transitory computer-readable medium of claim 15, wherein the endpoint is not a border leaf of the first data center fabric, wherein the subset is less than the plurality of endpoints of each data center fabric, wherein the operation further comprises:

receiving a second packet, wherein the second packet includes a header encapsulating a second MAC frame, wherein the header includes, as a destination address, the address of the networking device;

identifying, via the binding, a replacement destination address for the second packet;

replacing the destination address of the second packet with the replacement address; and forwarding the second packet towards the destination identified by the destination address.

22. The non-transitory computer-readable medium of claim 21, wherein a count of multicast states maintained in the interconnected data center fabrics is proportional to a count of leaves designated as border leaves for their data center fabrics, in order to more scalably manage multicast states in the interconnected data center fabrics than maintaining a count of multicast states proportional to the count of endpoints functioning as multicast sources.

23. The non-transitory computer-readable medium of claim 22, wherein a count of unicast states maintained in the given data center fabric is proportional to the count of leaves designated as border leaves for the one or more other data center fabrics in the interconnected data center fabrics, in order to more scalably manage unicast states in the given data center fabric than maintaining a count of unicast states proportional to the count of endpoints in the one or more other data center fabrics.

24. The non-transitory computer-readable medium of claim 23, wherein upon any virtual machine migration within the first data center fabric, unicast states in the second data center fabric is not updated, thereby improving scalability of managing the unicast states in the second data fabric by reducing a frequency with which the unicast states in the second data center fabric is updated, such that the frequency is no longer proportional to a count of virtual machine migrations within the first data center fabric;
  wherein each endpoint comprises a virtual extensible local area network (VxLAN) Tunnel End Point (VTEP), wherein the unicast states are stored as one or more VTEP tables containing next-hop adjacencies as bindings of MAC address to IP address.

25. The non-transitory computer-readable medium of claim 24, wherein a total count of distinct next-hop adjacencies stored in learning inter-data-center-fabric MAC addresses is reduced, wherein a total count of source-comma-group states stored in the backbone network is reduced;
  wherein the first data center fabric includes a plurality of secondary rendezvous points including the rendezvous point, in order to provide load balancing for maintaining multicast states in the interconnected data center fabrics;
  wherein the first and second data center fabrics comprise first and second Internet Protocol (IP) data center fabrics, wherein the backbone network comprises an IP backbone network, wherein the networking device is a border leaf in the first IP data center fabric, wherein the border leaf connects the first IP data center fabric to the second IP data center fabric over the IP backbone network.

26. The non-transitory computer-readable medium of claim 25, wherein the border leaf applies a predefined set of forwarding rules in serving as a secondary rendezvous point, wherein the predefined set of forwarding rules includes:
  a first rule specifying to relay any register message received from the first data center fabric, to the primary rendezvous point only after replacing inner and outer source addresses with border leaf addresses;
  a second rule specifying to relay any star-comma-group join/prune message received from the first data center fabric, to the primary rendezvous point;
  a third rule specifying to relay any source-comma-group join/prune message received from the first data center fabric, to a source of the source-comma-group join/prune message;
  a fourth rule specifying to relay any source-comma-group-comma-rendezvous-point-tree join/prune message received from the first data center fabric, to the primary rendezvous point;
  a fifth rule specifying not to relay any star-comma-group join/prune message received from the backbone network, into the first data center fabric; and
  a sixth rule specifying not to relay any source-comma-group join/prune message received from the backbone network, into the first data center fabric.

27. The non-transitory computer-readable medium of claim 26, wherein the header encapsulating the MAC frame is a virtual extensible local area network (VxLAN) header, wherein the networking device is a root of a multicast tree for the first IP data center fabric, wherein, acting as the secondary rendezvous point, the networking device forwards protocol-independent multicast (PIM) messages based on whether they are received from the first IP data center fabric or from the IP backbone network, wherein the operation further comprises:
  sending one or more join messages to the source address identified in the packet to establish a multicast state in the first IP data center fabric;
  prior to replacing the source address in the header, forwarding the packet towards one or more leaf networking devices in the first IP data center fabric; and
  storing, in the memory, a binding between a source MAC address in the MAC frame and the source address in the header.

* * * * *